US010540508B2

(12) United States Patent
Byun et al.

(10) Patent No.: US 10,540,508 B2
(45) Date of Patent: Jan. 21, 2020

(54) METHOD AND APPARATUS FOR SECURING A DATABASE CONFIGURATION

(75) Inventors: Ji-Won Byun, Redwood City, CA (US); Chi Ching Chui, San Ramon, CA (US); Daniel ManHung Wong, Palo Alto, CA (US); Chon Hei Lei, Alameda, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 751 days.

(21) Appl. No.: 12/561,461

(22) Filed: Sep. 17, 2009

(65) Prior Publication Data

US 2011/0067084 A1 Mar. 17, 2011

(51) Int. Cl.
*G06F 21/62* (2013.01)

(52) U.S. Cl.
CPC .............................. *G06F 21/6209* (2013.01)

(58) Field of Classification Search
CPC ........... G06F 21/6209; G06F 17/30348; G06F 17/30351; G06F 17/30359; G06F 17/30362; G06F 17/30168; G06F 17/30171; G06F 17/30306; G06F 16/217; G06F 16/2343
USPC .................. 707/687, 694, 704, 999.8, 999.9; 710/200; 711/100, 154, 163, 164; 726/2, 726/3, 16, 17, 18, 21
See application file for complete search history.

(56) References Cited

U.S. PATENT DOCUMENTS

| 5,414,839 | A   | * | 5/1995 | Joshi ....................... G06F 9/524 |
| 5,555,388 | A   | * | 9/1996 | Shaughnessy .... G06F 17/30171 707/999.002 |
| 6,338,063 | B1  | * | 1/2002 | Barr ............................. 707/704 |
| 7,111,005 | B1  | * | 9/2006 | Wessman ............... G06F 21/604 |
| 7,380,271 | B2  | * | 5/2008 | Moran et al. ...................... 726/4 |
| 7,689,209 | B1  | * | 3/2010 | Spitz ................. H04M 3/42178 370/331 |
| 2002/0065701 | A1 | * | 5/2002 | Kim ................. G06Q 10/06311 705/7.13 |
| 2003/0028521 | A1 | * | 2/2003 | Teloh ................... H04L 41/0803 |
| 2003/0084069 | A1 | * | 5/2003 | Boreham ............ G06F 21/6227 |
| 2005/0027987 | A1 | * | 2/2005 | Neufeld et al. ................ 713/176 |
| 2005/0108396 | A1 | * | 5/2005 | Bittner ................... G06Q 10/06 709/225 |
| 2005/0216748 | A1 | * | 9/2005 | Yeung ..................... G06F 21/70 713/187 |
| 2006/0069703 | A1 | * | 3/2006 | Carr .......................... G06F 9/52 |
| 2008/0071997 | A1 | * | 3/2008 | Loaiza et al. .................. 711/154 |

(Continued)

*Primary Examiner* — Hares Jami

(74) *Attorney, Agent, or Firm* — Shun Yao; Park, Vaughn, Fleming & Dowler LLP

(57) ABSTRACT

One embodiment of the present invention provides a system that secures a database configuration from undesired modifications. This system allows a security officer to issue a configuration-locking command, which activates a lock for the configuration of a database object. When a configuration lock is activated for a database object, the system prevents a user (e.g., a database administrator) from modifying the configuration of the database object, without restricting the user from accessing the database object itself. The security officer is a trusted user that is responsible for maintaining the stability of the database configuration, such that a configuration lock activated by the security officer preserves the database configuration by overriding the privileges assigned to a database administrator.

20 Claims, 7 Drawing Sheets

(56) References Cited

U.S. PATENT DOCUMENTS

| | | | |
|---|---|---|---|
| 2008/0082534 A1* | 4/2008 | Eigmeann | G06F 9/52 |
| 2008/0120302 A1* | 5/2008 | Thompson | G06F 21/6209 |
| 2009/0077008 A1* | 3/2009 | Francis | 707/1 |
| 2010/0114967 A1* | 5/2010 | Yaniv et al. | 707/785 |

* cited by examiner

METHOD AND APPARATUS FOR SECURING A DATABASE CONFIGURATION

BACKGROUND

Field

The present disclosure generally relates to a database management system. More specifically, the present disclosure relates to techniques and systems for securing a database configuration from undesired modifications.

Related Art

A change management procedure is critical for safely applying changes to an information system. However, it is oftentimes challenging to ensure that a change to a database system is performed in a secure manner without compromising prior security configuration. This is because a change to the database can modify a security configuration for a database object that is critical for many different aspects of the database system. If the change operation is not performed correctly, it can introduce a seemingly insignificant change to the database object which can results in undesirable security breaches.

For example, applying a patch for one database application may alter a security configuration for a database object that is used by a plurality of database applications. It is possible that a modification to the configuration of this database object may render this configuration invalid for other database applications. In a further example, it is possible that applying a patch may grant an additional privilege to a role which grants a set of users unintended access to sensitive data.

Moreover, large organizations typically require many database administrators to work together to manage an information system. These individual database administrators can have privileged access which allows them to modify the configuration of the information system. As the number of database administrators grows, it becomes increasingly difficult to ensure that all database administrators understand and enforce a uniform system-wide security policy. It is critical that these organizations ensure that a security configuration is safely protected from any malicious or unintended alteration performed by a privileged user.

SUMMARY

One embodiment of the present invention provides a system that secures a database configuration from undesired modifications. This system allows a security officer to issue a configuration-locking command, which activates a lock for the configuration of a database object. When a configuration lock is activated for a database object, the system prevents a user (e.g., a database administrator) from modifying the configuration of the database object, without restricting the user from accessing the database object itself. The security officer is a trusted user that is responsible for maintaining the stability of the database configuration, such that a configuration lock activated by the security officer preserves the database configuration by overriding the privileges assigned to a database administrator.

In some embodiments, a configuration lock can be activated for a database object such as a user account, a user role, a table object, a table view, a database trigger, or a procedure. If the database object is a user account or a user role, activating a lock for the configuration of the database object can prevent a user from deleting the object, modifying a configuration of the object, and modifying an audit policy associated with the object.

For a database object that is a table object or a table view, activating a lock for the configuration of the object can prevent a user from deleting the object, altering a property of the object, granting or revoking a privilege associated with the object, and modifying an audit policy associated with the object.

For a database object that is a database trigger, activating a lock for configuration of the database trigger can prevent a user from deleting the database trigger, modifying the current state of the database trigger, modifying or replacing a definition for the database trigger, and modifying an audit policy associated with the database trigger.

For a database object that is a procedure, activating a lock for the procedure can prevent a user from deleting the procedure, modifying or replacing a header for the procedure, modifying or replacing a definition of the procedure, granting or revoking a privilege associated with the procedure, and modifying an audit policy associated with the procedure.

Note that the system can also apply a system-wide configuration lock for the database, which prevents modifications to the configuration of the database by a user, without changing the privileges assigned to the user.

In some embodiments, the system can authorize a database procedure so that it can execute on the database. To do so, the system generates a signature for the database procedure, and enters the signature in a one-way hash function to obtain a hash value. The system then generates an encrypted hash value from the obtained hash value using a private certificate, and stores the encrypted hash value in association with the database procedure. Note that the system can then use the encrypted hash value to authenticate the database procedure at a later time.

To authenticate the database procedure, the system generates a signature for the database procedure, and enters this signature in the one-way hash function to obtain an expected hash value. The system then decrypts the encrypted hash value using a public certificate to obtain a decrypted hash value, and determines whether the decrypted hash value matches the expected hash value. If they match, then the system allows the database procedure to execute. Otherwise, if they do not match, then the system has determined that the database procedure has not been authorized, and prevents the database procedure from executing.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Database Management System

Figure 1:
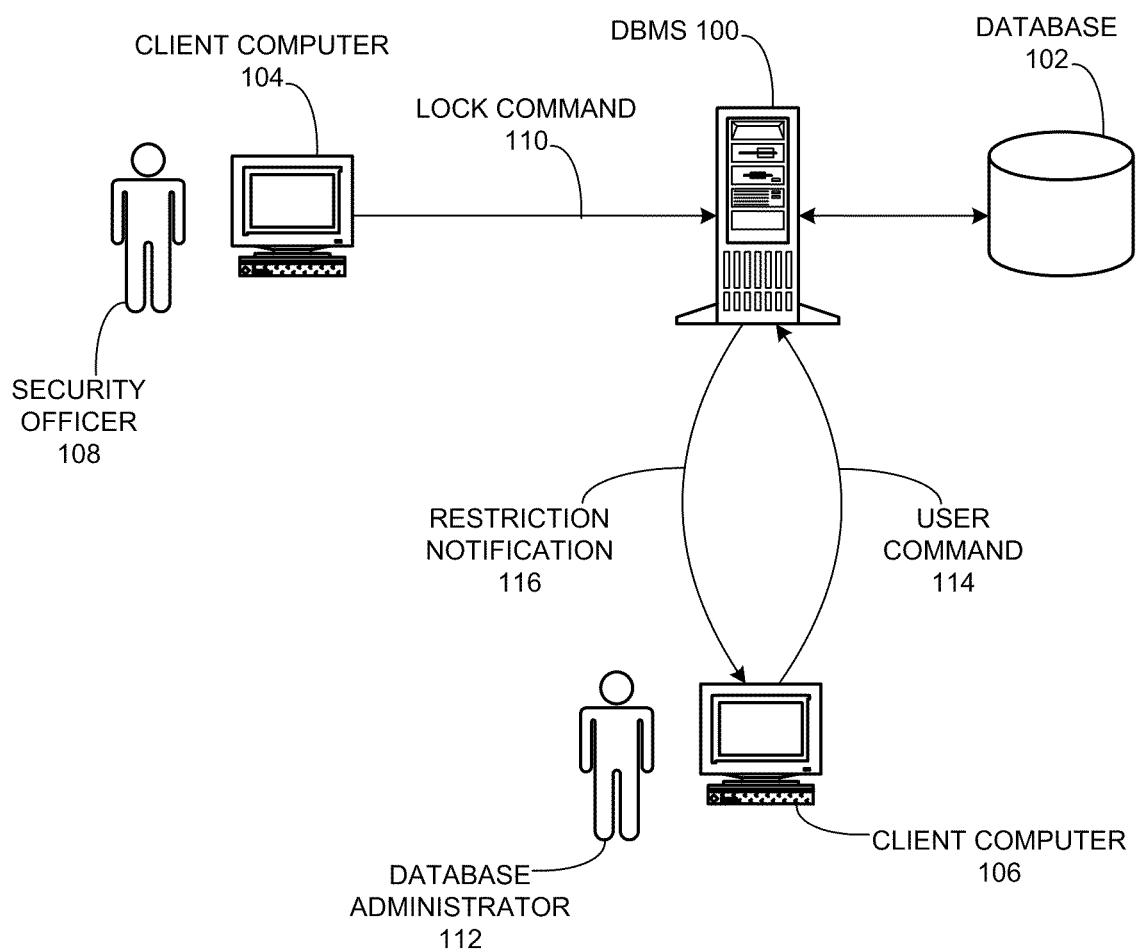
FIG. 1 illustrates an exemplary application of a database management system in accordance with an embodiment of the present invention.

FIG. 1 illustrates an exemplary application of a database management system (DBMS) in accordance with an embodiment of the present invention. DBMS 100 can be coupled to a database 102, and client computers 104-106. Furthermore, DBMS 100 provides methods that can support a secure change management procedure for a database 102 through a configuration-locking mechanism, which can lock the configuration of a database object from being modified. This configuration-locking mechanism is activated by a specific user role (i.e., a security officer 108) that is responsible for configuring and maintaining a secure configuration of database 102.

During operation, security officer 108 can issue a lock command 110, which activates a lock for the configuration of one or more database objects. Then, when a user (e.g., a database administrator 112) issues a user command 114 which attempts to modify the configuration of a locked database object, DBMS 100 prevents the locked configuration of the database object from being modified. Furthermore, DBMS 100 can issue a restriction notification 116 to the user, which informs the user that user command 114 has been blocked from modifying the locked configuration of the database object.

Security officer 108 is responsible for safeguarding the configuration of database 102, and does not manage the responsibilities associated with database administrator 112 (i.e., managing user accounts and/or access to database objects). Security officer 108 is responsible for ensuring that other users, including any database administrator 112 responsible for managing the daily operations of database 102, do not perform a modification on the configuration of database 102 that introduces a security risk. Note that security officer 108 restricts access to the configuration of a database object, without necessarily restricting access to the database object itself.

Also note that the security officer is a trusted user that is responsible for maintaining the stability of the database configuration, such that the security officer is different from a database administrator. Furthermore, the security officer is capable of activating a lock for a database object which overrides the privileges assigned to the database administrator.

Once the security state of a database object is properly configured (e.g., a database object is properly created and configured, and/or necessary privileges and/or roles are granted to appropriate users or user roles), security officer 108 can place a configuration lock on the database object to ensure that a user is not allowed to change the configuration for the database object. For example, after a set of database objects, user roles, and users required for a new database application are properly configured, security officer 108 can place a configuration lock on these database objects to ensure that the configuration for the database application remains secure. In a further example, security officer 108 can place a lock on a given user role (e.g., PUBLIC, or VISITOR) to ensure that no additional privileges and/or user roles are granted to this user role.

The configuration-locking mechanism provides a simple and effective solution for securing the configuration of database 102. A locking mechanism can prevent database administrator 112 from abusing or misusing any powerful system privileges. Furthermore, a locking mechanism can secure the configuration of a database object without restricting access to, or usage of the database object. Another important advantage to using the configuration-locking mechanism is that it allows the administration of DBMS 100 to continue to be performed by a database administrator, while security officer 108 controls when and/or on which object an administration task can be performed. In some embodiments, a failed attempt by database administrator 112 to modify a locked configuration of a database object can be specifically audited so that any malicious activity can be easily monitored.

Database Locking Mechanism

Figure 2:
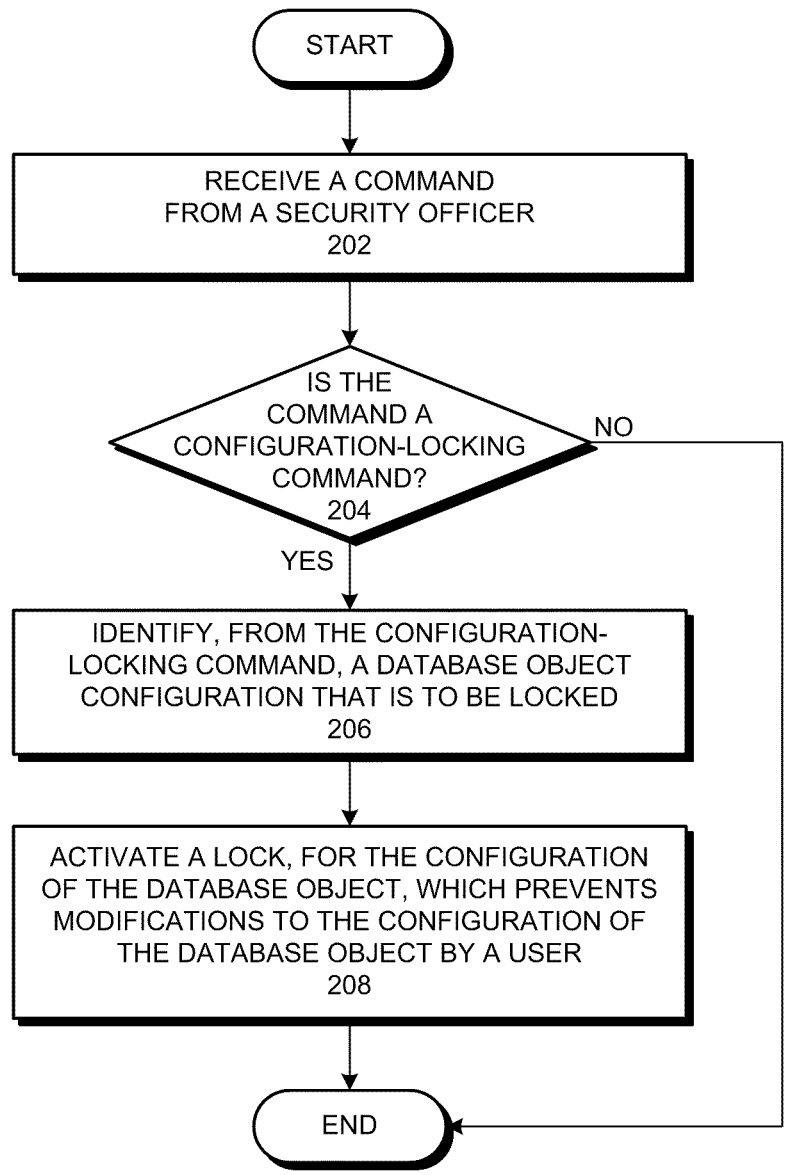
FIG. 2 presents a flowchart illustrating a process for activating a lock for the configuration of a database object in accordance with an embodiment of the present invention.

FIG. 2 presents a flowchart illustrating a process for activating a lock for the configuration of a database object in accordance with an embodiment of the present invention. Using this process, a DBMS can allow a security officer to secure the database configuration from any undesired modifications by a user (e.g., a database administrator). In some embodiments, this process may include additional or fewer operations. Moreover, the order of the operations may be changed and/or two or more operations may be combined into a single operation.

This process can be performed by computer system which includes a computer-readable storage medium which stores instructions that when executed by the computer system can cause the system to perform the underlying operations. The system can begin by receiving a command from a security officer (operation 202). Next, the system determines whether the command is a configuration-locking command (operation 204). If so, the system identifies, from the configuration-locking command, a database object configuration that is to be locked (operation 206). The system then activates a lock, for the configuration of the database object, which prevents modifications to the configuration of the database object by a user (operation 208).

Note that if the system determines in operation 204 that the command is not a configuration-locking command, the system does not perform operations 206-208 that activate a lock for the configuration of a database object. Furthermore, when the system activates a lock for the configuration of a database object, the system does not modify the privileges assigned to a user (or a user role) to restrict the user from modifying the configuration of the database object.

Figure 3:
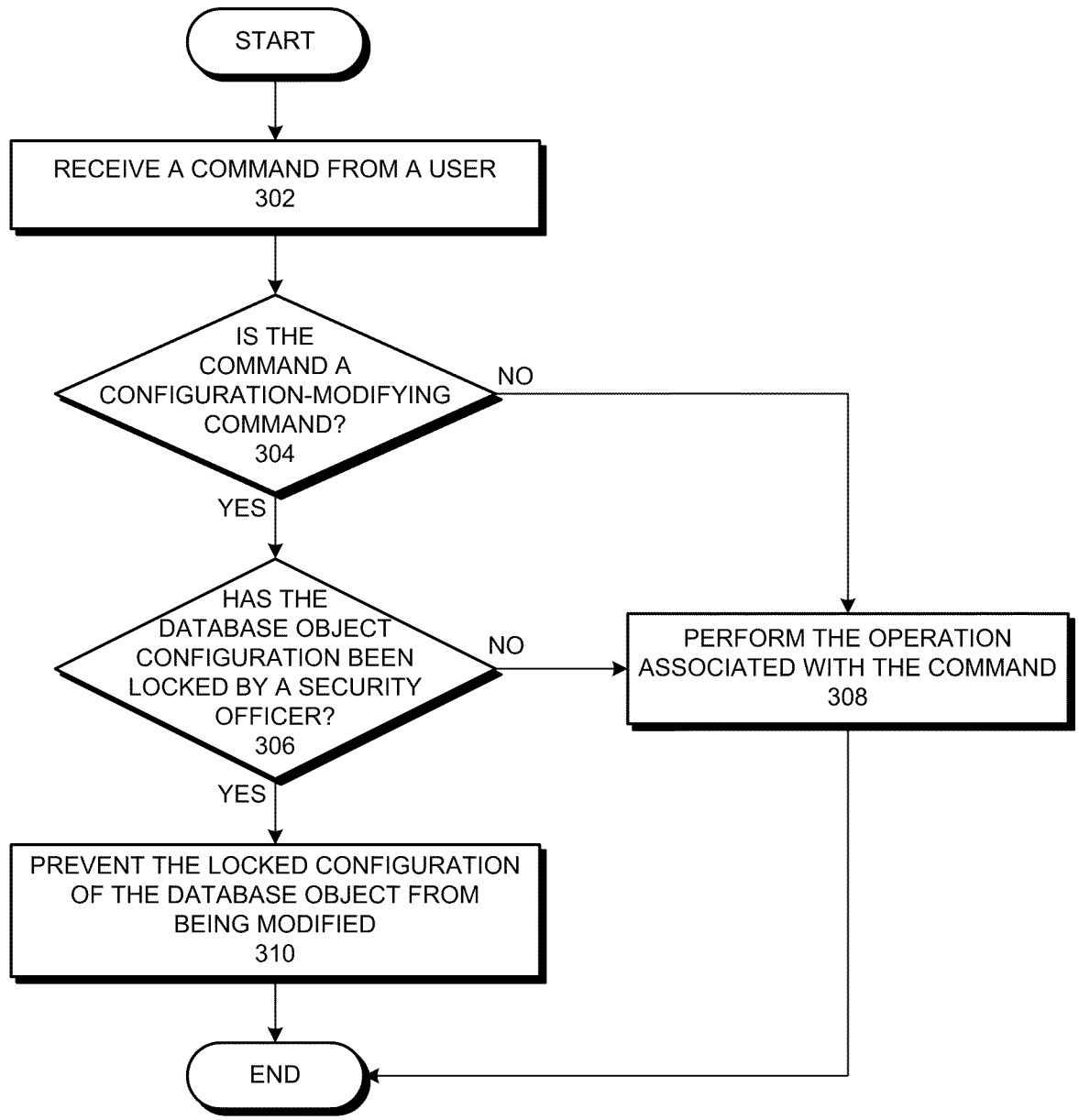
FIG. 3 presents a flowchart illustrating a process for preventing the locked configuration of a database object from being modified in accordance with an embodiment of the present invention.

FIG. 3 presents a flowchart illustrating a process for preventing the locked configuration of a database object from being modified in accordance with an embodiment of the present invention. In some embodiments, this process may include additional or fewer operations. Moreover, the order of the operations may be changed and/or two or more operations may be combined into a single operation.

The system can begin by receiving a command from a user (operation 302), and determining whether the command is a configuration-modifying command (operation 304). If so, the system then determines whether the configuration of the database object has been locked by a security offer (operation 306). Then, if the configuration of the database object has been locked by a security officer, the system prevents the locked configuration of the database object from being modified (operation 310). Otherwise, if operation 304 determines that the user command is not a configuration-modifying command, or if operation 306 determines that the configuration of the database object has not been locked by a security officer, the system performs the operation associated with the command (operation 308).

Note that when the system performs operation 310 to prevent the locked configuration of a database object from being modified, the system can perform aspects of the operation associated with the command which do not modify a locked configuration of a database object. Furthermore, the system can also notify the user that the operation has been blocked from modifying the configuration of the database object.

Table 1 presents a set of exemplary database objects for which the configuration can be locked in accordance with an embodiment of the present invention. Note that the exemplary set of database objects is not a complete list of objects to which the configuration-locking mechanism can apply. For example, the configuration-locking mechanism can be extended to support schema-level or database-level protection. Moreover, the configuration-locking mechanism can also apply to non-DBMS objects (e.g., an audit policy in a DBMS), such that a configuration-locking command for a database audit can prevent the existing audit policies from being altered.

In some embodiments, a database object can be an object selected from the group consisting of at least: a user account, a user role, a table object, a table view, a database trigger, and a procedure. If the database object is a user account, activating a lock for the configuration of the user account can prevent a user from deleting the user account, modifying a configuration of the user account, and modifying an audit policy associated with the user account. Similarly, if the database object is a user role, activating a lock for the configuration of the user role can prevent a user from deleting the second user role, modifying a configuration of the user role, and modifying an audit policy associated with the second user role.

For a database object that is a table object or a table view, activating a lock for the configuration of the table object or table view can prevent a user from deleting the object, altering a property of the object, granting or revoking a privilege associated with the object, and modifying an audit policy associated with the object.

For a database object that is a database trigger, activating a lock for configuration of the database trigger can prevent a user from deleting the database trigger, modifying the current state of the database trigger, modifying or replacing a definition for the database trigger, and modifying an audit policy associated with the database trigger.

For a database object that is a procedure, activating a lock for the procedure prevents a user from deleting the procedure, modifying or replacing a header for the procedure, modifying or replacing a definition of the procedure, granting or revoking a privilege associated with the procedure, and modifying an audit policy associated with the procedure.

TABLE 1

| Target Object | Lock Command Syntax | Impacts |
|---|---|---|
| User | LOCKIN USER u1; | No user can drop u1.<br>No user can change the profile of u1.<br>Privileges/roles cannot be granted to, or revoked from u1.<br>No user can change an audit policy related to u1.<br>User u1 is not restricted from performing any database operations that it has permissions for by the current security setting. |
| Role | LOCKIN ROLE r1 FOR ADMIN; | No user can drop r1.<br>No user can change an audit policy related to r1. |
| Table/View | LOCKIN TABLE tab1; | No user can drop tab1.<br>No user can alter a property of tab1 (e.g., a column, a column type, logging, a constraint, encryption, etc.).<br>No user can grant or revoke a privilege related to tab1. |

TABLE 1-continued

| Target Object | Lock Command Syntax | Impacts |
| --- | --- | --- |
| Trigger | LOCKIN TRIGGER trg1; | No user can change an audit policy related to tab1. Users are not restricted from accessing or modifying tab1. No user can drop trg1. No user can change a current state of trg1 (i.e., enabled/disabled). No user can replace the definition of trg1. No user can change an audit policy related to trg1. |
| Procedure/ Function | LOCKIN PROCEDURE p1; | No user can drop p1. No user can replace the header or the definition of p1. No user can grant or revoke a privilege related to p1. No user can change an audit policy related to p1. |

In some embodiments, the system allows a security officer to activate a system-wide lock for the database to prevent modifications to the configuration of the database by a user associated with a given user role, without changing the privileges assigned to the user role. This system-wide lock allows the security officer to "freeze" the configuration of the database. Any command from a database administrator which performs a configuration-modifying operation (e.g., activating a feature, modifying an object parameter, or installing a new application) requires the database administrator to follow a workflow authorization procedure which grants the database administrator permission from a security officer (or, optionally from a remote workflow/approval system) to perform the operation. The workflow authorization procedure allows a security officer to govern the operations performed by a database administrator, which can guarantee that any configuration to the database is performed after a review/authorization procedure is performed which follows a protocol that is sanctioned by the security officer.

Role-Based Access Control Locks

The DBMS provided by embodiments of the present invention includes two new configuration locks for locking a user role: ADMIN lock and GRANT lock. These two configuration locks prevent modifications to the configuration of a given user role, without impacting the usage of the user role.

An ADMIN lock can be used to lock the configuration of a user role, such that the locked user role is prevented from being granted to or revoked from another user role. An ADMIN lock that is activated for a given user role is enforced by also applying the ADMIN lock to any user role that is granted the given user role (i.e., the restriction is upward in role-hierarchy). Therefore, when a user role is ancestor of an ADMIN-locked user role, the ancestor user role is also prevented from being assigned to or revoked from another user role. Note that an ADMIN lock can be activated on a user role via a database command, such as "LOCKIN ROLE r1 FOR ADMIN" which activates an ADMIN configuration lock for a user role r1. Furthermore, when the configuration of a user role is locked with ADMIN lock, even a privileged user (i.e., a user with 'GRANT ANY ROLE' or a user who has been granted the role with ADMIN OPTION) is prevented from granting or revoking this ADMIN-locked user role to/from any user.

A GRANT lock can be used to lock the configuration of a user role, such that a privilege or user role is blocked from being granted to or revoked from the locked user role. A GRANT lock that is activated for a given user role is enforced by also applying the GRANT lock to any user role that is granted to the given user role (i.e., the restriction is downward in role-hierarchy). Therefore, when a given user role is a descendant of a GRANT-locked user role, the descendant user role is also prevented from being granted a privilege or user role, or from having that privilege or user role revoked. Note that a GRANT lock can be activated on a user role via a command, such as "LOCKIN ROLE r1 FOR GRANT" which activates a GRANT configuration lock for a user role r1. Furthermore, when the configuration of a user role is locked with GRANT lock, even a privileged user is prevented from granting privileges to or revoking privileges from this GRANT-locked user role.

Back-End Locks

The DBMS provided by embodiments of the present invention manages a set of public certificates. During operation, these public certificates are used to determine whether a module has been authorized to execute on the DBMS. The DBMS can authorize a new module by signing the new module using a private certificate. This produces an encrypted hash value that is associated with the authorized module. Furthermore, when the DBMS loads a module, the DBMS will compute a signature for the module, and use the public certificate to validate that the module was indeed signed by an authorized private certificate.

Figure 4:
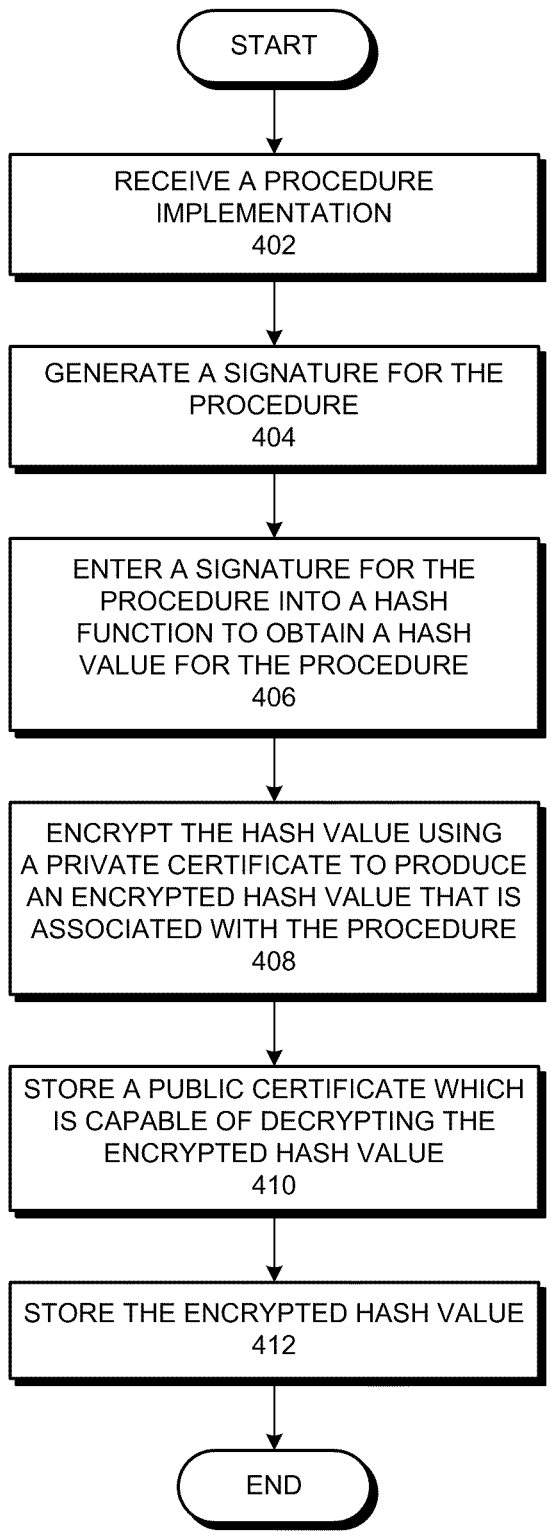
FIG. 4 presents a flowchart illustrating a process for authorizing a procedure implementation in accordance with an embodiment of the present invention.

FIG. 4 presents a flowchart illustrating a process for authorizing a procedure implementation to execute on a database in accordance with an embodiment of the present invention. In some embodiments, this process may include additional or fewer operations. Moreover, the order of the operations may be changed and/or two or more operations may be combined into a single operation.

The system can begin by receiving a procedure implementation (operation 402). Next, the system generates a signature for the procedure (operation 404), and enters the signature into a hash function to obtain a hash value for the procedure (operation 406). Then, the system encrypts the hash value using a private certificate to produce an encrypted hash value that is associated with the procedure (operation 408). The system then stores a public certificate which is capable of decrypting the encrypted hash value (operation 410), and stores the encrypted hash value (operation 412). Note that the hash function used in operation 406 can be a one-way hash function.

In some embodiments, the system generates a public certificate/private certificate pair for each signature that is being encrypted. Furthermore, because the private certificate is used to encrypt an expected hash value that is associated with a given signature, it is likely that the private certificate is not used after the encrypted hash value is stored. The system can delete the private certificate after generating and storing the encrypted hash value.

Figure 5:
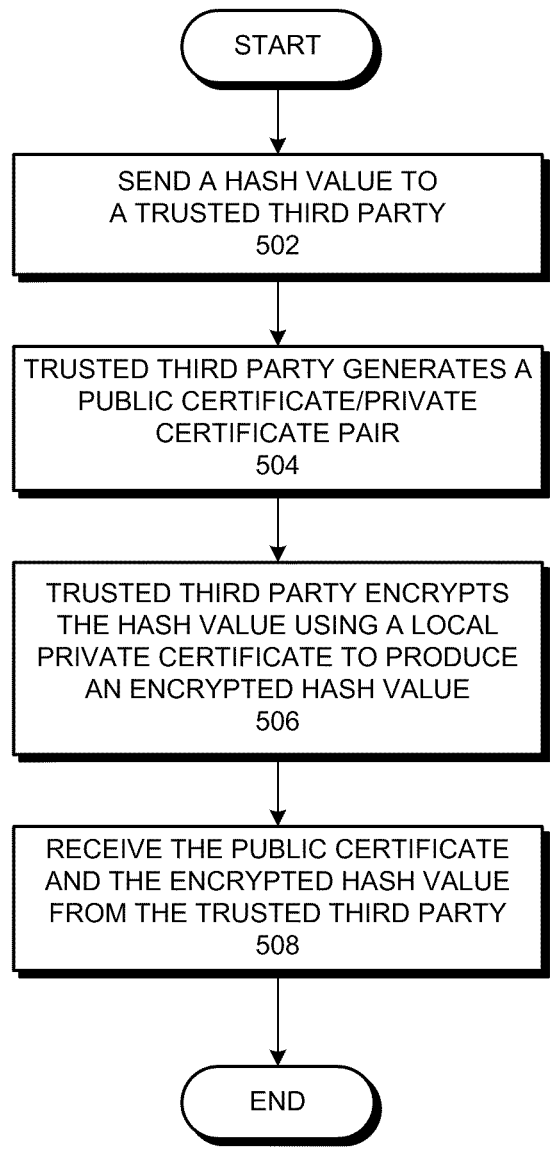
FIG. 5 presents a flowchart illustrating a process for receiving an encrypted hash value from a trusted third party in accordance with an embodiment of the present invention.

FIG. 5 presents a flowchart illustrating a process for receiving an encrypted hash value from a trusted third party in accordance with an embodiment of the present invention. In some embodiments, this process may include additional or fewer operations. Moreover, the order of the operations may be changed and/or two or more operations may be combined into a single operation.

The system can make use of a trusted third party to receive a public digital certificate, as well as to encrypt a hash value in a manner that it can be decrypted using the public digital certificate. The system can begin by sending the hash value to the trusted third party (operation 502). Then, the trusted third party generates a public certificate/private certificate pair (operation 504), and encrypts the hash value using the private certificate to produce the encrypted hash value (operation 506). The system then receives the public certificate and the encrypted hash value from the trusted third party (operation 508). Note that the trusted third party can be a certification authority (CA) such as VeriSign, Inc., or it can be a trusted database client.

Figure 6:
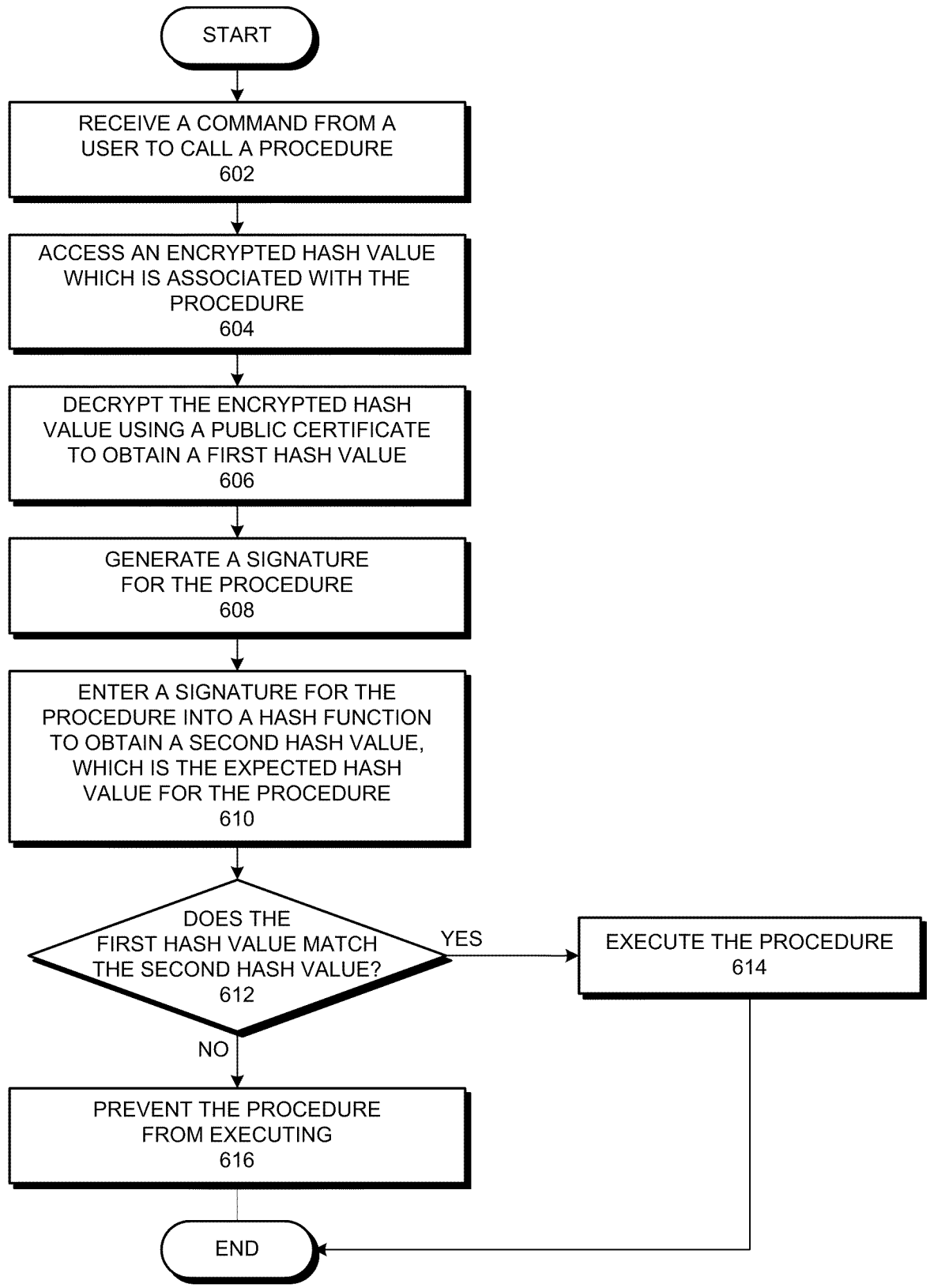
FIG. 6 presents a flowchart illustrating a process for blocking an unauthorized procedure from executing in accordance with an embodiment of the present invention.

FIG. 6 presents a flowchart illustrating a process for blocking an unauthorized procedure from executing in accordance with an embodiment of the present invention. In some embodiments, this process may include additional or fewer operations. Moreover, the order of the operations may be changed and/or two or more operations may be combined into a single operation.

The system can begin by receiving a command from a user to call the procedure (operation 602). Next, the system accesses an encrypted hash value which is associated with the procedure (operation 604), and decrypts the encrypted hash value using a public certificate to obtain the stored hash value (operation 606). Then the system generates a signature for the procedure (operation 608), and enters the signature into a hash function to obtain an expected hash value for the procedure (operation 610). The system then determines whether the expected hash value matches the stored hash value (operation 612). If so, the system can execute the procedure (operation 614). On the other hand, if the system determines that the expected hash value does not match the stored hash value, the system prevents the procedure from executing (operation 616). Note that when the system performs operation 616 to prevent the procedure from executing, the system can also notify the user that the procedure has been blocked from executing.

Figure 7:
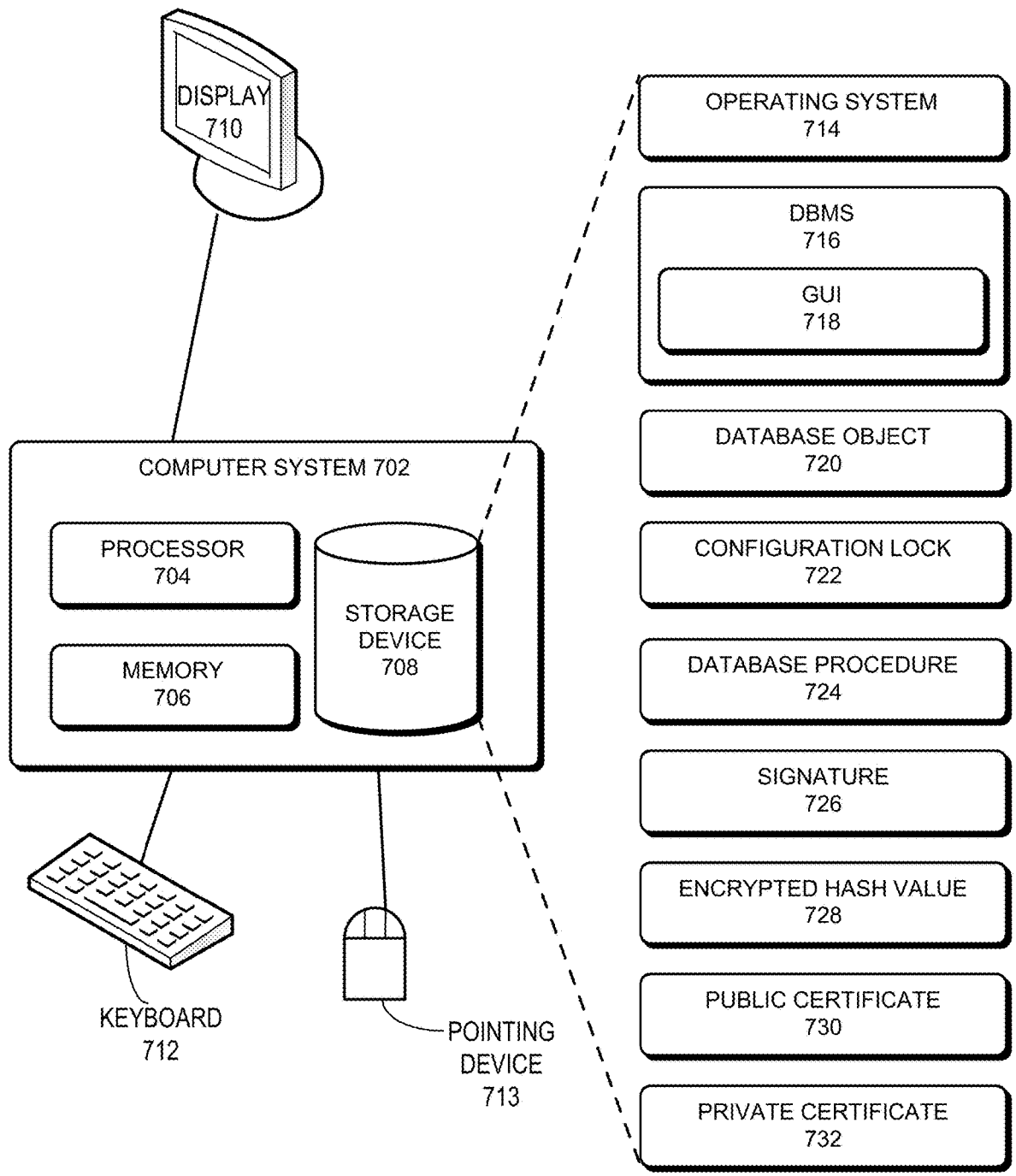
FIG. 7 illustrates an exemplary computer system that facilitates securing a database configuration from undesired modifications in accordance with an embodiment of the present invention.

FIG. 7 illustrates an exemplary computer system that facilitates securing a database configuration from undesired modifications in accordance with an embodiment of the present invention. Computer system 702 includes a processor 704, a memory 706, and a storage device 708. Furthermore, computer system 702 can be coupled to a display device 710, a keyboard 712, and/or a pointing device 713.

Storage device 708 stores at least one of an operating system 714, a DBMS 716, a database object 720, a configuration lock 722, a database procedure 724, a signature 726, an encrypted hash value 728, a public certificate 730, and a private certificate 732. Note that DBMS 718 can include a graphical user interface (GUI) 718. During operation, DBMS 716 is loaded from storage device 708 into memory 706 and executed by processor 704. DBMS 716 can receive a command from a security officer for activating or deactivating a configuration lock 722 for database object 720. Note that when configuration lock 722 is activated for database object 720, DBMS 716 prevents a user from modifying the configuration of database object 720, without restricting access to configuration object 720.

DBMS 716 can authorize database procedure 724 to execute on computer system 702. To do so, DBMS 716 generates signature 726 for database procedure 724, and enters signature 726 in a one-way hash function to obtain a hash value. DBMS 716 then generates encrypted hash value 728 from the obtained hash value using private certificate 732. DBMS 716 stores encrypted hash value 728 in association with database procedure 724, so that it can use encrypted hash value 728 to authenticate database procedure 724 at a later time. To authenticate database procedure 724, DBMS 716 generates a signature for database procedure 724, and enters this signature in the one-way hash function to obtain an expected hash value. DBMS then decrypts encrypted hash value 728 using public certificate 730 to obtain a decrypted hash value, and determines whether the decrypted hash value matches the expected hash value. If they match, then database procedure 724 is allowed to execute. Otherwise, if they do not match, then DBMS 716 has determined that database procedure 724 has not been authorized, and prevents database procedure 724 from executing.

Figure 8:
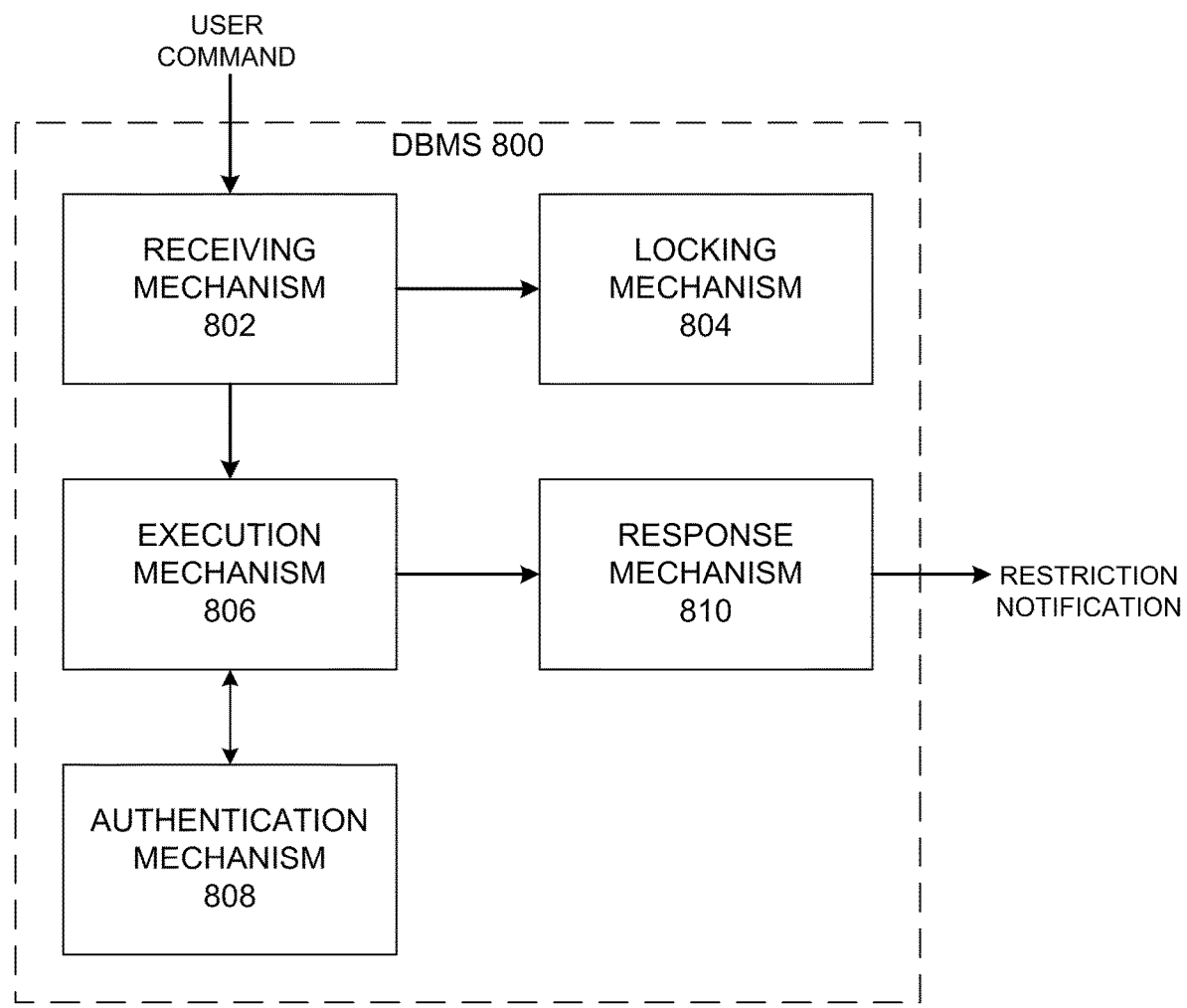
FIG. 8 illustrates an apparatus that facilitates securing a database configuration from undesired modifications in accordance with an embodiment of the present invention.

FIG. 8 illustrates an apparatus that facilitates securing a database configuration from undesired modifications in accordance with an embodiment of the present invention. DBMS 800 can comprise a number of mechanisms which may communicate with one another via a wired or wireless communication channel. DBMS 800 may be realized using one or more integrated circuits, and it may be integrated in a computer system, or it may be realized as a separate device which is capable of communicating with other computer systems and/or devices. Specifically, DBMS 800 can include a receiving mechanism 802, a locking mechanism 804, an execution mechanism 806, an authentication mechanism 808, and a response mechanism 810.

Receiving mechanism 802 takes as input a user command, which can be from a security officer, a database administrator, or a database user. When a security officer issues a command to either activate or deactivate a configuration lock for a database object, locking mechanism 804 executes the command to activate or deactivate the configuration lock. Otherwise, if a user of DBMS 800 issues a command which modifies the configuration of a database object or which performs a call to a database procedure, DBMS 800 forwards the command to execution mechanism 806.

Execution mechanism 806 can determine whether the user command is allowed. For example, if the user command attempts to modify the configuration of a database object, execution mechanism 806 can determine whether a configuration lock has been activated for the configuration of the database object. If so, then execution mechanism 806 prevents the configuration of the database object from being modified, and response mechanism 810 can send a restriction notification to the user. In a second example, execution mechanism 806 can interact with authentication mechanism 808 to determine whether a called procedure is authorized to execute on DBMS 800. If authentication mechanism 808 determines that the database procedure is not authorized to execute on DBMS 800, then execution mechanism 806 prevents the database procedure from executing, and response mechanism 810 can send a restriction notification to the user. Note that a security officer can also use authentication mechanism 808 to authorize a database procedure to execute on DBMS 800.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    receiving a user command executable by a database management system (DBMS);
    determining that the user command invokes a first lock, which is facilitated by the DBMS, for a first role defined in a database, wherein the first lock is a configuration lock that prevents any database user from granting or revoking the first role in the database;
    in response to the determination, applying, by the DBMS, the first lock in the database to the first role; and
    in response to receiving any command that requests a grant or revocation of the first role or a grant or revocation of a second role that is an ancestor role of the first role, preventing the command from being executed on the DBMS.

2. The computer-implemented method of claim 1, wherein the first lock is activated by a security officer associated with the first role, wherein the security officer is a trusted user that is responsible for maintaining the stability of the database configuration, and wherein the security officer is different from a database administrator.

3. The computer-implemented method of claim 1, wherein the first lock locks the configuration of the first role.

4. The computer-implemented method of claim 1, wherein applying the first lock comprises applying the first lock to the second role, thereby preventing a grant or revocation of the second role.

5. The computer-implemented method of claim 1, wherein the first lock is applied upward to a respective role in a role-hierarchy of the first role, wherein the role-hierarchy of the first role includes the second role and any ancestor role thereof.

6. The computer-implemented method of claim 1, wherein the command is from a user with a privilege to grant any role or a user who has been granted the role with an admin option.

7. The computer-implemented method of claim 1, further comprising:
    activating, by the DBMS, a second lock in the database for a database object, wherein a third role has a privilege to modify a configuration of the database object in the database, wherein the second lock prevents modifications to the configuration of the database object by any user of the third role without changing the privileges assigned to the third role, and wherein activating the second lock does not restrict any user of the third role from modifying the contents of the database object;
    in response to determining that a command, which is from a user of the third role, modifies the configuration of the database object, preventing the command from modifying the configuration of the database object; and
    in response to determining that the command does not modify the configuration of the database object, allowing the command to modify the contents of the database object.

8. The computer-implemented method of claim 7, wherein the database object is one of: a user account, a table object, a table view, a database trigger, and a procedure, and wherein activating the second lock prevents any user of the third role from performing one or more operations selected from the group consisting of:
    deleting the database object;
    modifying the current state of the database object;
    modifying or replacing a definition for the database object; and
    modifying an audit policy associated with the database object.

9. The computer-implemented method of claim 1, further comprising:
    activating a system-wide lock for the database to prevent modifications to the configuration of the database by a user associated with a fourth role, without changing the privileges assigned to the fourth role.

10. The computer-implemented method of claim 9, further comprising:
    receiving a configuration-modifying command from the user associated with the fourth role;
    determining whether the user has followed a workflow authorization procedure that allows the user to execute the command; and
    in response to determining that the user has followed the workflow authorization procedure, executing the configuration-modifying command on the DBMS.

11. A computer-implemented method, comprising:
    receiving a user command executable by a database management system (DBMS);
    determining that the user command invokes a first lock, which is facilitated by the DBMS, for a first role defined in a database, wherein the first lock is a configuration lock that prevents any privilege and any role from being granted to or revoked from the first role in the database;
    in response to the determination, applying, by the DBMS, the first lock to the first role; and
    in response to receiving any command that requests a grant or revocation of a role or a privilege for the first role or a second role that is a descendant role of the first role, preventing the command from being executed on the DBMS.

12. The computer-implemented method of claim 11, wherein the first lock is activated by a security officer associated with the first role, wherein security officer is a trusted user that is responsible for maintaining the stability of the database configuration, and wherein the security officer is different from a database administrator.

13. The computer-implemented method of claim 11, wherein the first lock locks the configuration of the first role.

14. The computer-implemented method claim 11, wherein applying the first lock comprises activating the first lock for the second role, thereby preventing a privilege or role from being granted or revoked from the second role.

15. The computer-implemented method of claim 11, wherein the first lock is applied downward to a respective role in a role-hierarchy of the first role, wherein the role-hierarchy of the first role includes the second role and any descendant role thereof.

16. The computer-implemented method of claim 11, wherein the command is from a user with a privilege to grant any role.

17. The computer-implemented method of claim 11, further comprising:
- activating, by the DBMS, a second lock in the database for a database object, wherein a third role has a privilege to modify a configuration of the database object in the database, wherein the second lock prevents modifications to the configuration of the database object by any user of the third role without changing the privileges assigned to the third role, and wherein activating the second lock does not restrict any user of the third role from modifying the contents of the database object;
- in response to determining that a command, which is from a user of the third role, modifies the configuration of the database object, preventing the command from modifying the configuration of the database object; and
- in response to determining that the command does not modify the configuration of the database object, allowing the command to modify the contents of the database object.

18. The computer-implemented method of claim 17, wherein the database object is one of: a user account, a table object, a table view, a database trigger, and a procedure, and wherein activating the second lock prevents any user of the third role from performing one or more operations selected from the group consisting of:
- deleting the database object;
- modifying the current state of the database object;
- modifying or replacing a definition for the database object; and
- modifying an audit policy associated with the database object.

19. The computer-implemented method of claim 11, further comprising:
- activating a system-wide lock for the database to prevent modifications to the configuration of the database by a user associated with a fourth role, without changing the privileges assigned to the fourth role.

20. The computer-implemented method of claim 19, further comprising:
- receiving a configuration-modifying command from the user associated with the fourth role;
- determining whether the user has followed a workflow authorization procedure that allows the user to execute the command; and
- in response to determining that the user has followed the workflow authorization procedure, executing the configuration-modifying command on the DBMS.

* * * * *

UNITED STATES PATENT AND TRADEMARK OFFICE
CERTIFICATE OF CORRECTION

Page 1 of 1

PATENT NO. : 10,540,508 B2
APPLICATION NO. : 12/561461
DATED : January 21, 2020
INVENTOR(S) : Byun et al.

It is certified that error appears in the above-identified patent and that said Letters Patent is hereby corrected as shown below:

On the Title Page

Column 2, under Attorney Agent, or Firm, Line 1, delete "Vaughn," and insert -- Vaughan, --, therefor.

In the Claims

In Column 12, Line 59, in Claim 14, after "method" insert -- of --.

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*